US012785024B2

(12) United States Patent
Ochi et al.

(10) Patent No.: US 12,785,024 B2
(45) Date of Patent: Nov. 3, 2026

(54) ELECTRIC FIELD EMISSION DEVICE

(71) Applicants: MEIDENSHA CORPORATION, Tokyo (JP); WASEDA UNIVERSITY, Tokyo (JP)

(72) Inventors: Hayato Ochi, Tokyo (JP); Rena Takahashi, Tokyo (JP); Suguru Noda, Tokyo (JP); Kotaro Yasui, Tokyo (JP); Hisashi Sugime, Tokyo (JP)

(73) Assignee: MEIDENSHA CORPORATION; WASEDA UNIVERSITY, Tokyo (JP)

( * ) Notice: Subject to any disclaimer, the term of this patent is extended or adjusted under 35 U.S.C. 154(b) by 210 days.

(21) Appl. No.: 18/711,014

(22) PCT Filed: Sep. 1, 2022

(86) PCT No.: PCT/JP2022/032997
§ 371 (c)(1),
(2) Date: May 16, 2024

(87) PCT Pub. No.: WO2023/089912
PCT Pub. Date: May 25, 2023

(65) Prior Publication Data

US 2025/0014853 A1 Jan. 9, 2025

(30) Foreign Application Priority Data

Nov. 17, 2021 (JP) ................................ 2021-187431

(51) Int. Cl.
*H01J 35/04* (2006.01)
*H01J 35/06* (2006.01)

(52) U.S. Cl.
CPC .......... *H01J 35/045* (2013.01); *H01J 35/065* (2013.01); *H01J 2235/064* (2013.01)

(58) Field of Classification Search
CPC ........ H01J 35/04; H01J 35/045; H01J 35/065; H01J 35/16; H01J 35/116; H01J 35/06; H01J 35/064; H01J 2235/064; H01J 2235/166
See application file for complete search history.

(56) References Cited

U.S. PATENT DOCUMENTS

| | | | |
|---|---|---|---|
| 9,761,404 | B2 | 9/2017 | Tang et al. |
| 10,068,741 | B2 | 9/2018 | Takahashi et al. |
| 2015/0078511 | A1 | 3/2015 | Tang et al. |
| 2017/0365439 | A1 | 12/2017 | Takahashi et al. |

FOREIGN PATENT DOCUMENTS

| | | | |
|---|---|---|---|
| JP | 2016-539483 | A | 12/2016 |
| JP | 6135827 | B2 | 5/2017 |

*Primary Examiner* — Jurie Yun
(74) *Attorney, Agent, or Firm* — Foley & Lardner LLP

(57) ABSTRACT

An electric field emission device includes a vacuum vessel configured to include a vacuum chamber; an emitter positioned on one side in an axial direction of the chamber and including an electron generation portion facing another side in the axial direction; a target positioned on the other side of the chamber and facing the emitter; a guard electrode that is a cylindrical body, is fixed to the vacuum vessel, and has an opening portion; a support to move the emitter in the axial direction on an inner side of the guard electrode; and an electric field shield body formed of a conductor connected to the guard electrode. The electric field shield body partially overlaps the opening portion on a projection plane in the axial direction, and is formed in a shape partitioning the opening portion into a plurality of areas.

7 Claims, 12 Drawing Sheets

ELECTRIC FIELD EMISSION DEVICE

TECHNICAL FIELD

The present invention relates to an electric field emission device applied to various devices such as an X-ray device, an electron tube, and a lighting device.

BACKGROUND ART

A conventional electric field emission device is applied to various devices such as an X-ray device, an electron tube, and a lighting device. The electric field emission device includes an emitter (an electron source such as carbon) and a target that are disposed to face each other at a predetermined distance in a vacuum chamber of a vacuum vessel. The electric field emission device emits an electron beam from the emitter by applying a voltage between the emitter and the target (electric field emission). Then, the electron beam collides with the target to exert a desired function such as fluoroscopic resolution by external emission of the X-ray.

An emitter in an electric field emission device disclosed in Patent Literature 1 is configured to apply a voltage to a guard electrode in a state where an electron generation portion of the emitter and the guard electrode are separated from each other by an operation of a support portion. As a result, in Patent Literature 1, at least the guard electrode in the vacuum chamber can be subjected to the reforming treatment, and a desired withstand voltage can be obtained in the electric field emission device. Further, in the electric field emission device disclosed in Patent Literature 1, the electron generation portion and the guard electrode are configured to be separated from each other by the operation of the support portion as described above, so that the electric field emission device can be downsized.

CITATION LIST

Patent Literature

Patent Literature 1: JP 6135827 B2

SUMMARY OF INVENTION

Technical Problem

However, in a case where the dimension in a longitudinal direction of the device is shortened as a reduction in size of the electric field emission device, the retraction amount of the emitter is insufficient as a result of shortening of a bellows and a support (support portion of the emitter). As a result, even though the emitter is retracted to the maximum extent, when a sufficient voltage is applied during the reforming treatment of the electric field emission device, electrons are excessively emitted from the emitter and the emitter is damaged, and when the voltage is set low in order to suppress the damage to the emitter, the electric field emission device may be insufficiently reformed and a desired withstand voltage may not be obtained.

Therefore, the present invention has been made in view of the above circumstances, and an object is to provide an electric field emission device capable of obtaining a predetermined withstand voltage even in a case where the retraction amount of an emitter is small.

Solution to Problem

One aspect of the present invention is an electric field emission device including: a vacuum vessel configured to include a vacuum chamber; an emitter that is positioned on one side in an axial direction of the vacuum chamber and includes an electron generation portion facing an other side in the axial direction of the vacuum chamber; a target that is positioned on the other side of the vacuum chamber and provided to face the emitter; a guard electrode that is a cylindrical body provided on an outer peripheral side of the emitter, is fixed to the vacuum vessel on one side, and has an opening portion on the other side; a support configured to move the emitter in the axial direction on an inner side of the guard electrode; and an electric field shield body that is formed of a conductor connected to the guard electrode and is disposed on one side of an edge portion of the guard electrode, wherein the electric field shield body is disposed so as to partially overlap the opening portion on a projection plane in the axial direction, and is formed in a shape partitioning the opening portion into a plurality of areas.

In the electric field emission device described above, the electric field shield body may be formed of one or more linear members fixed to an edge portion of the opening portion. In the electric field emission device described above, the electric field shield body may be formed of the linear members disposed in a lattice shape. In the electric field emission device described above, the electric field shield body may be formed in a plate shape having a plurality of through-holes.

In the electric field emission device described above, when the emitter moves to the other side and comes into contact with the guard electrode, the electric field shield body may partition the electron generation portion to form edges. In the electric field emission device described above, at least one surface of the emitter or the support may be electrically insulating at a contact portion between the emitter and the support.

In the electric field emission device described above, an axial height of the electric field shield body may be formed to be lower than an axial height of the electron generation portion. In the electric field emission device described above, the electric field shield body may be formed integrally with the guard electrode.

Advantageous Effects of Invention

According to the present invention, a predetermined withstand voltage can be obtained even in a case where the retraction amount of an emitter is small.

DESCRIPTION OF EMBODIMENTS

Figure 1:
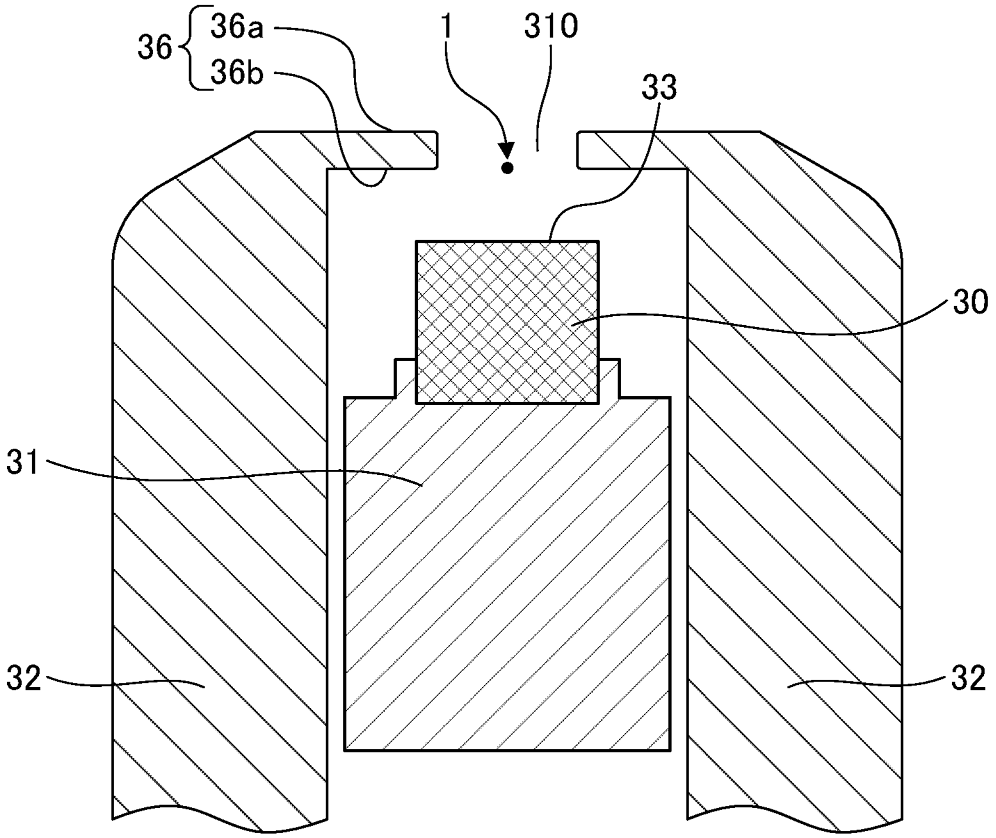
FIG. 1 is an enlarged cross-sectional diagram of an electric field shielding structure of an electric field emission device according to a first embodiment.

Hereinafter, preferred embodiments of the present invention will be described using embodiments and drawings with reference to the accompanying drawings. Note that, in each drawing, the same members or elements are denoted by the same reference numerals, and redundant description will be omitted or simplified.

First Embodiment

Figure 2:
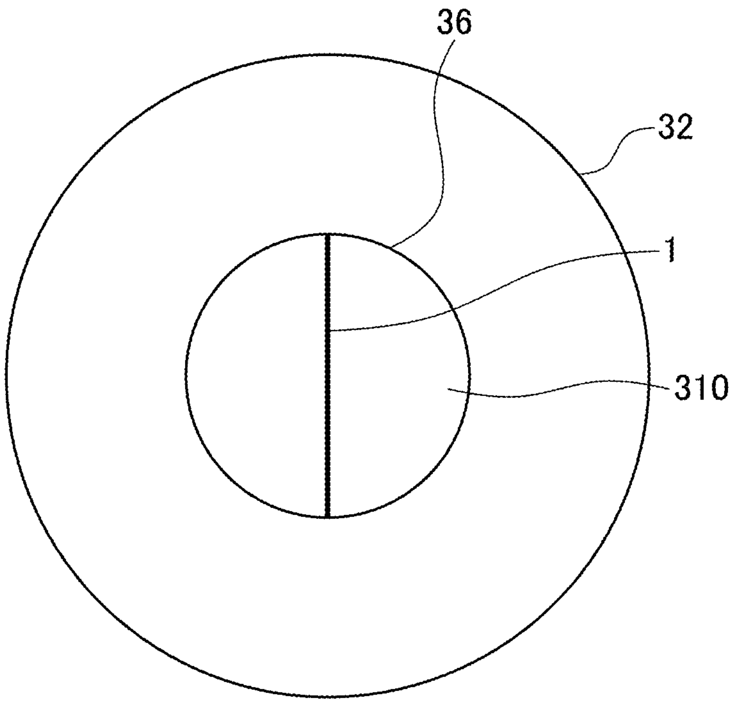
FIG. 2 is a schematic plan diagram of the electric field shielding structure of FIG. 1.
Figure 5:
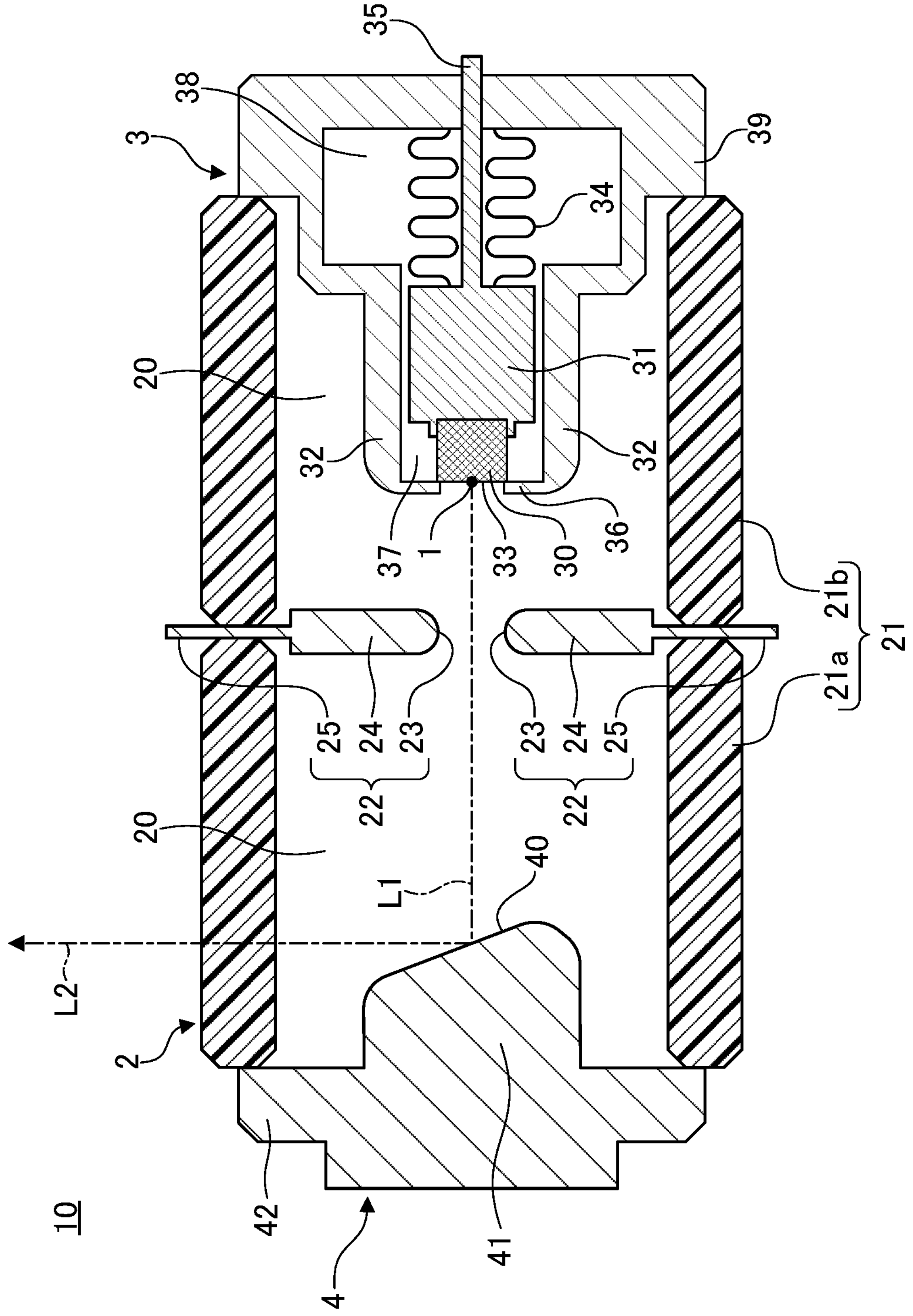
FIG. 5 is a schematic cross-sectional diagram illustrating an example of the electric field emission device of the first embodiment.

FIG. 1 is an enlarged cross-sectional diagram of an electric field shielding structure of an electric field emission device 10 according to the first embodiment. FIG. 2 is a schematic plan diagram of the electric field shielding structure of the first embodiment illustrated in FIG. 1. In addition, FIG. 5 is a schematic cross-sectional diagram illustrating an example of the electric field emission device 10 of the first embodiment. The electric field shielding structure of one aspect of the present invention illustrated in FIGS. 1, 2 and the like is applied to, for example, the electric field emission device 10 including an X-ray device, an electron tube, a lighting device, and the like.

Hereinafter, the electric field emission device 10 of the first embodiment will be described with reference to the electric field emission device 10 illustrated in FIG. 5. The electric field emission device 10 of the first embodiment includes a vacuum vessel 2, an emitter unit 3, and a target unit 4. Note that an emitter unit 3 side illustrated in FIG. 5 is defined as one side, and a target unit 4 side is defined as an other side. In addition, a direction from the one side toward the other side is defined as an axial direction. In addition, a direction orthogonal to (intersecting) the axial direction is defined as a radial direction (transverse direction).

(Vacuum Vessel 2)

The vacuum vessel 2 has an insulator 21 having a cylindrical shape extending in the axial direction. The insulator 21 insulates the emitter unit 3 and the target unit 4 from each other, and forms a vacuum chamber 20 inside the vacuum vessel 2 (on an inner wall side). In addition, it is sufficient if the insulator 21 is formed of an insulation material such as ceramic, can insulate the emitter unit 3 and the target unit 4 from each other as described above, and form the vacuum chamber 20 inside. The vacuum vessel 2 includes an insulation member 21*a* and an insulation member 21*b* having a cylindrical shape disposed in series. Further, the vacuum vessel 2 may be configured by assembling the insulation members 21*a* and 21*b* to each other by brazing or the like in a state where a grid electrode 22 is interposed therebetween.

The grid electrode 22 extending in the radial direction of the vacuum chamber 20 is provided between the emitter unit 3 and the target unit 4. Various forms of the grid electrode 22 can be applied as long as it is interposed between the emitter unit 3 and the target unit 4 and can appropriately control an electron beam L1 passing through the grid electrode 22. The grid electrode 22 includes, for example, an electrode portion 24 and a lead terminal 25. The electrode portion 24 is, for example, an electrode having a mesh shape, and extends in the radial direction of the vacuum chamber 20. A passage hole 23 through which the electron beam L1 passes is formed in the electrode portion 24. In addition, the lead terminal 25 penetrates the insulator 21 in the radial direction and is connected to the electrode portion 24.

(Emitter Unit 3)

The emitter unit 3 includes an emitter 30, an emitter support portion (support) 31, and a guard electrode 32.

The emitter 30 includes an electron generation portion 33 at a position (part) axially facing a target 41 of the target unit 4. The electron generation portion 33 generates electrons by voltage application and emits the electron beam L1. Note that various forms can be applied to the electron generation portion 33 as long as the electron generation portion 33 (radiator) can emit the electron beam L1 as illustrated in FIG. 5. For example, a material formed of carbon nanotubes or carbon fibers can be used for the electron generation portion 33. In addition, for example, the electron generation portion 33 may include the emitter 30 in which a material such as carbon is formed into a lump shape or deposited in a thin film shape. Further, in the electron generation portion 33, it is preferable to form the surface facing the target 41 of the target unit 4 to a concave or curved shape to facilitate focusing of the electron beam L1.

The emitter support portion 31 can move (is movable) in the axial direction inside the guard electrode 32, and supports the emitter 30 in a state where the electron generation portion 33 faces the target 41. For example, a base end side (a side opposite to the electron generation portion 33) of the emitter 30 is joined to the emitter support portion 31 by brazing or the like.

An operation portion 35 that operates the emitter support portion 31 is connected (attached) to the emitter support portion 31 via a bellows 34 that can expand and contract in the axial direction. By the operation of the operation portion 35, the bellows 34 expands and contracts, and as a result, the emitter support portion 31 moves in the axial direction, and the emitter 30 also moves in the same direction as the emitter support portion 31 in conjunction with the emitter support portion 31. Note that, in the first embodiment, the operation portion 35 has a shape partially extending from the side opposite to the emitter 30 and is configured integrally with the emitter support portion 31, but is not limited thereto, and may be configured to be detachable as they are separate bodies. Note that, in a contact portion between the emitter support portion 31 and the emitter 30, at least one surface of the emitter 30 or the emitter support portion 31 may be electrically insulating. For example, when the electron generation portion 33 is formed of carbon nanotubes, by forming the base end side of the emitter 30 with an insulator, the carbon nanotubes can be efficiently grown by using the insulator as a base.

By appropriately operating the emitter support portion 31, the distance between the electron generation portion 33 of the emitter 30 and the target 41 can be changed. For example, as illustrated in FIG. 1, when the electron generation portion 33 is at a non-discharge position separated from the guard electrode 32 and the electric field emission is in a suppressed state, desired reforming treatment can be performed on the guard electrode 32, the target 41, the grid electrode 22, and the like. Examples of the reforming treatment include melting and smoothing the surface of the guard electrode 32. In addition, for example, the electric field emission device 10 including the operation portion 35 can be easily downsized as compared with a conventional device or the like capable of electric field emission provided with a large-diameter exhaust pipe, and can reduce the manufacturing workload and the product cost.

Here, the reforming treatment of the guard electrode 32 of the electric field emission device 10 will be described below. First, the operation portion 35 of the emitter support portion 31 is operated to move the emitter 30 toward the one side (emitter unit 3 side, right side in FIG. 5) in the axial direction. As a result, the emitter 30 moves to the non-discharge position separated from the guard electrode 32 and is brought into a state where the electric field emission of the electron generation portion 33 is suppressed. At this time, both the electron generation portion 33 of the emitter 30 and an edge portion 36 of the guard electrode 32 are in a state of being non-contact with each other. In this state, for example, by appropriately applying a desired voltage between the guard electrode 32 and the grid electrode 22, the discharge is repeated in the guard electrode 32, and the guard electrode 32 is subjected to the reforming treatment.

Figure 4:
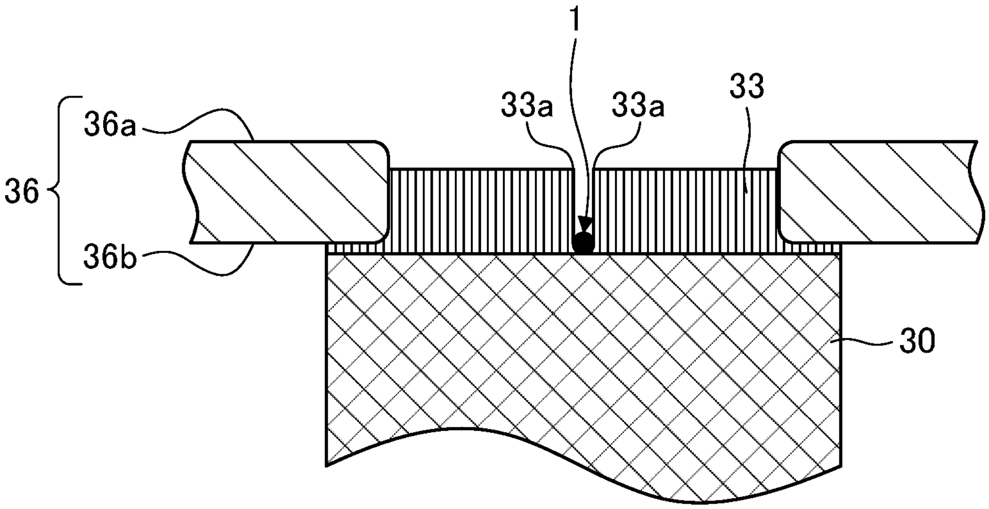
FIG. 4 is a schematic cross-sectional diagram of the electric field shielding structure of the first embodiment when the emitter is projected.

After the reforming treatment described above, the operation portion 35 of the emitter support portion 31 is operated again to move the emitter 30 from the non-discharge position toward the other side (target unit 4 side, left side in FIG. 5) in the axial direction, and the emitter 30 is brought into contact with the guard electrode 32 at a discharge position where the electron generation portion 33 is capable of electric field emission. The electron generation portion 33 of the emitter 30 and the edge portion 36 of the guard electrode 32 at the discharge position are in a state of being in contact with each other (for example, in contact under vacuum pressure of the vacuum vessel 2) as illustrated in FIGS. 4 and 5, for example. At the discharge position, the electron generation portion 33 of the emitter 30 and the guard electrode 32 have the same potential. For example, when a desired voltage is applied between the emitter 30 and the target 41 at the discharge position, electrons are generated from the electron generation portion 33 of the emitter 30, and the electron beam L1 is emitted. When the electron beam L1 is emitted from protrusions present on the surface of the guard electrode 32, the protrusions are heated, melted, and smoothed, so that the surface of the guard electrode 32 is reformed.

By the reforming treatment as described above, it is possible to suppress an event such as a flashover phenomenon (generation of electrons) from the guard electrode 32 in the electric field emission device 10 and to stabilize the amount of electrons generated in the electric field emission device 10. In addition, the electron beam L1 can be a focused electron flux, the focal point of an X-ray L2 is easily converged, and high fluoroscopic resolution can be obtained.

Note that various forms can be applied to the emitter support portion 31 as long as the emitter 30 can be supported to be movable with respect to the axial direction as described above. In addition, the emitter support portion 31 can be configured by applying various materials, and is not particularly limited, but for example, a conductive metal material such as stainless steel (SUS material or the like), copper, silver, or the like can be used.

Various forms can be applied to the bellows 34 as long as the bellows 34 can expand and contract in the axial direction as described above, and for example, a formed product obtained by appropriately processing a thin sheet-shaped metal material or the like can be used. In addition, the bellows 34 may be configured in, for example, an accordion shape extending in the axial direction so as to surround an outer peripheral side of the emitter support portion 31 or the operation portion 35.

The guard electrode 32 is disposed at a position facing the target 41 on one side of the vacuum chamber 20. The guard electrode 32 is a cylindrical electrode (cylindrical body) made of a metal material such as stainless steel (SUS material or the like), and is disposed on the outer peripheral side of the electron generation portion 33 of the emitter 30. Further, the guard electrode 32 includes the edge portion 36 having a flange shape protruding toward the inner periphery. In addition, the guard electrode 32 has an opening portion 310 on the inner side of the edge portion 36 having a flange shape. In addition, the guard electrode 32 includes a first accommodation portion 37 and a second accommodation portion 38 communicating therewith. The first accommodation portion 37 accommodates the emitter 30 and the emitter support portion 31. The second accommodation portion 38 is located on the one side of the first accommodation portion 37 and accommodates the bellows 34 and the operation portion 35. In addition, the second accommodation portion 38 is fixed to an edge portion of the insulation member 21*b* of the vacuum vessel 2 via a flange portion 39.

Further, the guard electrode 32 includes an electric field shield body 1 disposed in the opening portion 310 of the edge portion 36. The electric field shield body 1 of the first embodiment is formed of a conductor, and has a function of suppressing emission of electrons from the emitter 30 by weakening an electric field applied to the emitter 30 when a high voltage is applied between the guard electrode 32 and the target 41 for the reforming treatment.

The electric field shield body 1 is connected to the guard electrode 32 and has the same potential as the guard electrode 32. In addition, as illustrated in FIG. 2, the electric field shield body 1 is disposed so as to partially overlap the opening portion 310 of the guard electrode 32 on the projection plane in the axial direction, and is formed of a linear member such as an element wire or a wire. In addition, the electric field shield body 1 is formed in a shape that partitions (divides) the opening portion 310 of the guard electrode 32 in the radial direction.

By partitioning the opening portion 310 in the radial direction, the opening portion 310 can be divided into a plurality of areas. In addition, it is sufficient if the electric field shield body 1 uses a conductive metal material, and is formed of, for example, a material such as iron, stainless steel (SUS material or the like), copper, or silver, but is not limited thereto, and various materials can be applied. The materials of the guard electrode 32 and the electric field shield body 1 are preferably the same, but different conductive metal materials may be used. In the first embodiment, one (one piece of) electric field shield body 1 is used to partition the opening portion 310 of the guard electrode 32 into two areas. However, it is not limited thereto, and one or more electric field shield bodies 1 may be fixed to the opening portion 310 of the guard electrode 32 to partition the opening portion 310 into two or more areas.

In addition, the electric field shield body 1 is not limited to an existing member such as an element wire or a wire, and a conductive metal material whose cross-sectional shape is processed into a cylindrical shape, an elliptical shape, a flat shape, or a substantially rectangular shape may be used as the electric field shield body 1. Then, in this case, the electric field shield body 1 is formed of a conductive metal material similarly to the element wire, the wire, or the like.

Figure 3:
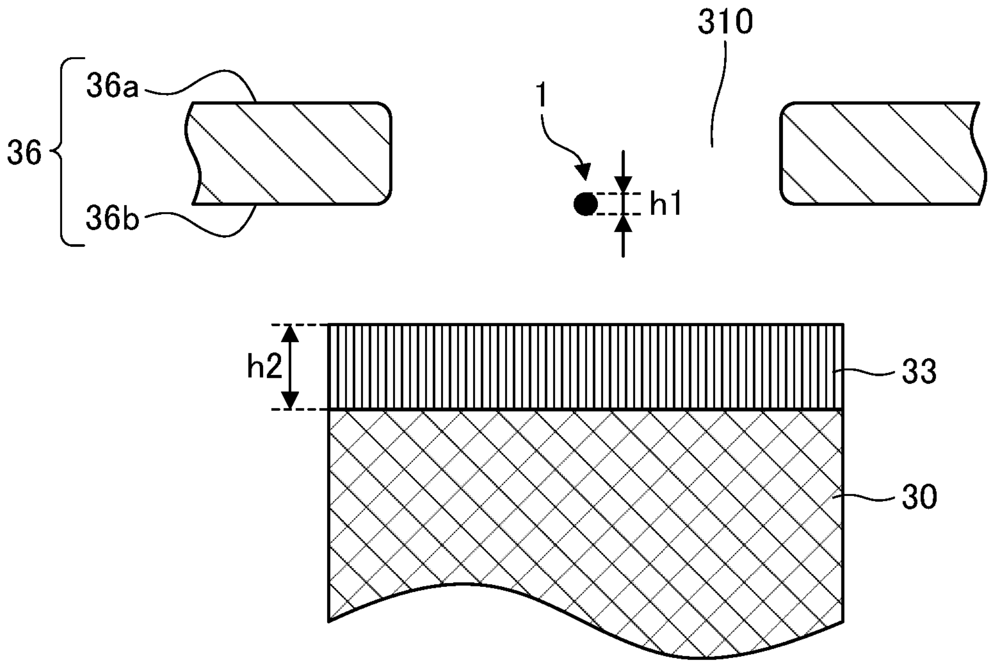
FIG. 3 is a schematic cross-sectional diagram of the electric field shielding structure of the first embodiment when the emitter is retracted.

The electric field shield body 1 is fixed (connected) to an edge (opening edge portion) of the opening portion 310 of the guard electrode 32. As illustrated in FIGS. 1 and 3, the electric field shield body 1 is disposed on the one side (emitter 30 side, lower side in FIGS. 1 and 3) of the edge portion 36 of the guard electrode 32. Regarding the electric field shield body 1 of the first embodiment, as illustrated in FIG. 2, one end of the electric field shield body 1 is fixed in a state of being in contact with the opening edge portion and an other end of the electric field shield body 1 is fixed in a state of being in contact with the opening edge portion at a position facing the one end of the electric field shield body 1. As a result, the opening portion 310 of the guard electrode 32 is partitioned in the radial direction by the electric field shield body 1, and the area of the opening portion 310 is divided into two. It is sufficient if a method for fixing the electric field shield body 1 to the opening edge portion of the guard electrode 32 is a fixation method in which the electric field shield body 1 does not come off. For example, the electric field shield body 1 and the guard electrode 32 may be mechanically connected or joined, may be secured by swaging, welding, or the like, or may be fixed by welding or the like.

When the one end and the other end of the electric field shield body 1 are fixed to the opening edge portion, it is preferable to fix the electric field shield body 1 in a state where a predetermined tension is applied when an element wire, a wire, or the like is used. When the electric field shield body 1 is fixed in a loosened state, if the electric field shield body 1 comes into contact with the electron generation portion 33 as will be described below, the electron generation portion 33 is not uniformly pressed, so that the formation of edges 33*a* becomes insufficient, and there is a possibility that the electron emission from the emitter 30 cannot be sufficiently improved. In addition, although the electric field shield body 1 is fixed to the opening edge portion of the guard electrode 32 as described above, the electric field shield body 1 and the guard electrode 32 may be integrally formed.

(Target Unit 4)

As illustrated in FIG. 5, the target unit 4 includes the target 41 and a flange portion 42. The target 41 is disposed at a position facing the electron generation portion 33 of the emitter 30 on the other side of the vacuum chamber 20.

The target 41 includes an inclined surface 40 formed to be inclined at a predetermined angle with respect to the axial direction at a part facing the electron generation portion 33 of the emitter 30. Then, when the electron beam L1 collides with the inclined surface 40, the X-ray L2 is emitted. The X-ray L2 is emitted in a direction bent from the irradiation direction of the electron beam L1 (for example, a transverse plane direction of the vacuum chamber 20 illustrated in FIG. 5). Further, various forms can be applied to the target 41 as long as the electron beam L1 emitted from the electron generation portion 33 of the emitter 30 collides with the target 41 and the X-ray L2 can be emitted. As illustrated in FIG. 5, the flange portion 42 is fixed to an edge portion of the insulation member 21*a* of the vacuum vessel 2.

(Operation and Effect of the Present Embodiment)

As described above, in the electric field emission device 10 of the first embodiment, a voltage is applied to the guard electrode 32 in a state where the electron generation portion 33 and the guard electrode 32 are separated from each other by the operation of the emitter support portion 31 by the operation portion 35. As a result, at least the guard electrode 32 in the vacuum chamber 20 can be subjected to the reforming treatment, and a desired withstand voltage can be obtained in the electric field emission device 10.

Here, as described above, in a case where the electron generation portion 33 and the guard electrode 32 are configured to be separated from each other by the operation of the emitter support portion 31 by the operation portion 35, the electric field emission device 10 can be downsized. In order to reduce the size, it is conceivable to shorten the dimension in the axial direction (longitudinal direction) of the electric field emission device 10 and shorten the bellows 34 and the emitter support portion 31. However, as a result of shortening the bellows 34 and the emitter support portion 31, the retraction amount of the emitter 30 may be insufficient. When the retraction amount of the emitter 30 is insufficient, even though the emitter 30 is retracted to the maximum extent, when a sufficient voltage is applied for the reforming treatment of the electric field emission device 10, electrons are excessively emitted from the emitter 30 and the emitter 30 is damaged, and when the voltage is set low in order to suppress the damage to the emitter 30, the electric field emission device 10 may be insufficiently reformed and a desired withstand voltage may not be obtained.

On the other hand, with the electric field shielding structure in which the electric field shield body 1 is disposed in the opening portion 310 of the guard electrode 32 as illustrated in FIGS. 1 and 2, the electric field on the emitter surface is relaxed, and the emission of electrons from the emitter 30 is prevented. Thus, even when the dimension in the axial direction of the electric field emission device 10 is shortened in order to downsize the electric field emission device 10 and the retraction amount of the emitter 30 is reduced, the emitter surface electric field can be shielded. Hereinafter, the electric field shielding structure of the first embodiment will be described with reference to FIGS. 3 and 4.

FIG. 3 is a schematic cross-sectional diagram of the electric field shielding structure of the first embodiment when the emitter 30 is retracted (non-discharge position). FIG. 4 is a schematic cross-sectional diagram of the electric field shielding structure of the first embodiment when the emitter 30 is projected (discharge position).

When the emitter 30 is projected, as illustrated in FIG. 4, a part of the electron generation portion 33 comes into contact with the surface 36*b* facing the one side (lower side in FIG. 4) of the edge portion 36 of the guard electrode 32, and the contact portion of the electron generation portion 33 is crushed. At this time, the electron generation portion 33 also comes into contact with the electric field shield body 1, and the contact portion of the electron generation portion 33 in contact with the electric field shield body 1 is also crushed. When crushed by the electric field shield body 1, a part of the electron generation portion 33 is partitioned, and the edges 33*a* are formed in the electron generation portion 33. Since the edges 33*a* are formed in the electron generation portion 33, when the electron generation portion 33 generates electrons by voltage application and emits the electron beam L1, electron emission efficiency can be improved by electric field concentration at the edges 33*a*.

Further, in the first embodiment, the height h1 of the electric field shield body 1 is preferably lower (smaller) than the height h2 of the electron generation portion 33. That is, the heights of the electric field shield body 1 and the electron generation portion 33 are set such that h2>h1. Here, for each height, as illustrated in FIG. 4, it is desirable to set each height so that a part of the electric field shield body 1 does not protrude from one end side (edge 33*a* side) of the electron generation portion 33 when the emitter 30 is projected (so that the electric field shield body 1 is buried in the electron generation portion 33). As described above, in the first embodiment, h2>h1 is set, and each of the heights h1 and h2 is set such that the electric field shield body 1 is hidden (buried) in the electron generation portion 33 when the emitter 30 is projected. As a result, it is possible to avoid the effect of the electric field shielding structure including the electric field shield body 1 on the emission electron trajectory.

Hereinafter, the effect of the electric field shielding structure of the first embodiment will be described with reference to FIGS. 6, 7, 8, 11, and 12. In order to confirm the effect of the electric field shielding structure of the first embodiment, electronic analysis was performed assuming that an analysis surface X was an electron emission portion using experimental models (test objects) 5 illustrated in FIGS. 6 and 7.

Figure 6:
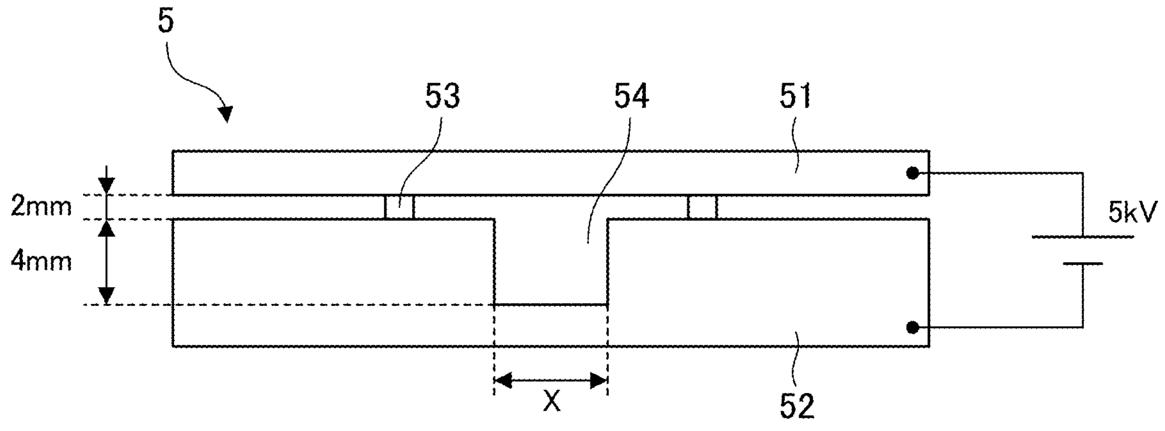
FIG. 6 is a diagram illustrating a test object assuming a case where there is no electric field shielding structure of the first embodiment.
Figure 7:
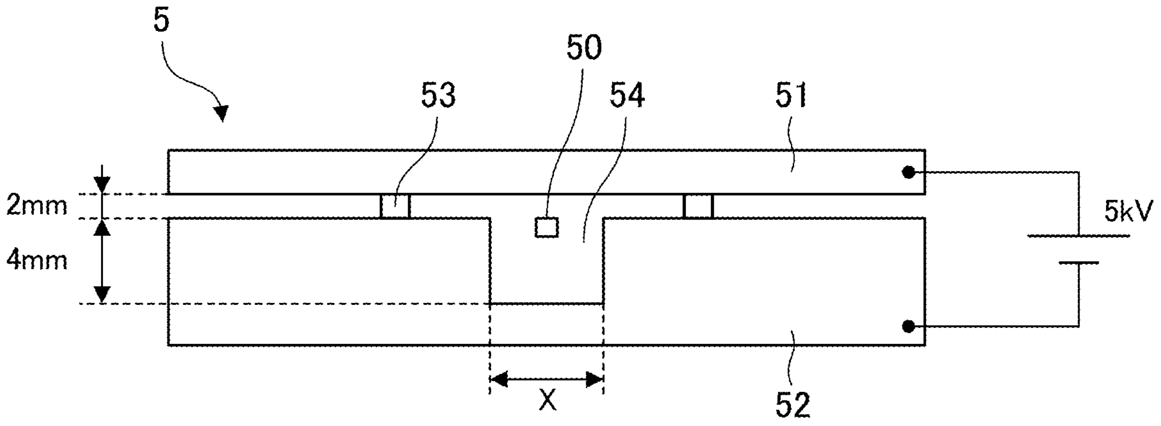
FIG. 7 is a diagram illustrating a test object assuming a case where there is an electric field shielding structure of the first embodiment.
Figure 8:
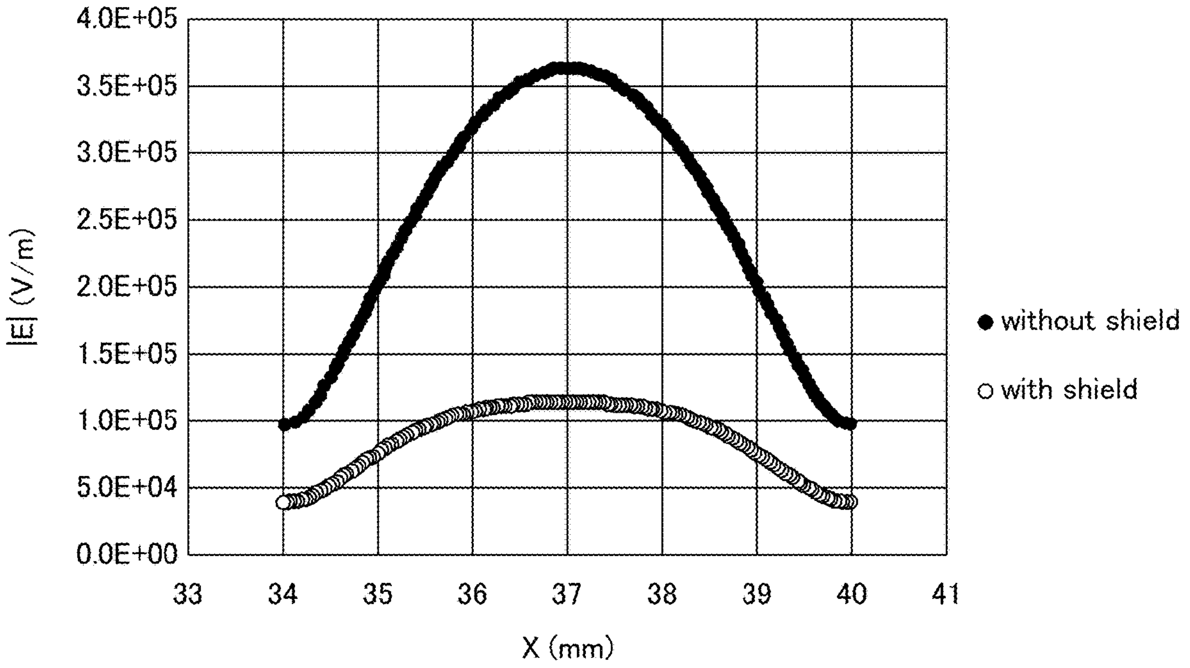
FIG. 8 is a diagram illustrating results of electronic analysis using the test objects of FIGS. 6 and 7.

FIG. 6 is a diagram illustrating a test model assuming a case where there is no electric field shielding structure of the first embodiment. FIG. 7 is a diagram illustrating a test model assuming a case where there is an electric field shielding structure of the first embodiment. FIG. 8 is a diagram illustrating results of electronic analysis performed using the test models 5 illustrated in FIGS. 6 and 7. The vertical axis in FIG. 8 represents the electric field intensity E (V/m), and the horizontal axis in FIG. 8 represents the horizontal position (mm) of the analysis surface X. In addition, in FIG. 8, "without shield" indicates an analysis result in the case of the test model 5 in FIG. 6, and "with shield" indicates an analysis result in the case of the test model 5 in FIG. 7.

Figure 11:
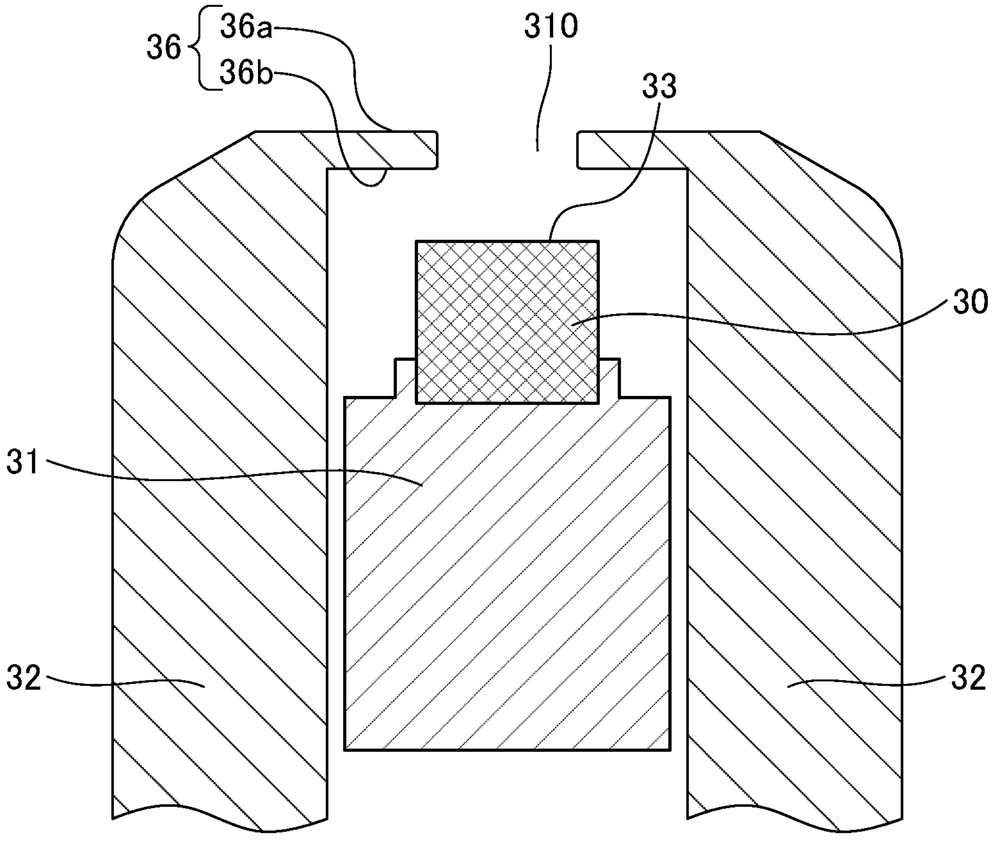
FIG. 11 is a schematic cross-sectional diagram of a conventional emitter unit.
Figure 12:
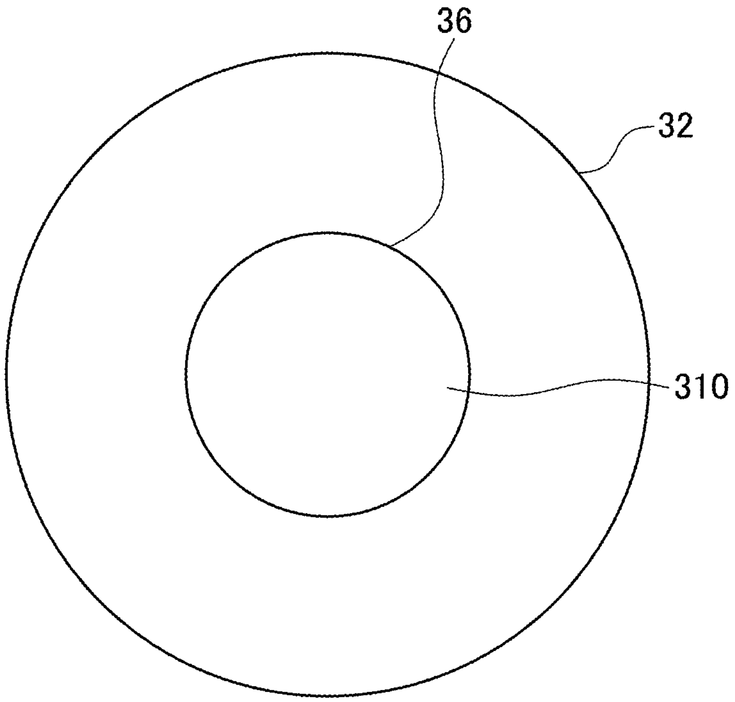
FIG. 12 is a schematic plan diagram of the emitter unit of FIG. 11.

FIG. 11 is a schematic cross-sectional diagram around an opening portion of a guard electrode of a conventional emitter unit. FIG. 12 is a schematic plan diagram around the opening portion of the guard electrode of the emitter unit of FIG. 11. The test model 5 of FIG. 6 simulates a portion around the opening portion of the guard electrode of the emitter unit illustrated in FIGS. 11 and 12. Then, the test model 5 of FIG. 7 simulates a portion around the opening portion 310 of the guard electrode 32 of the emitter unit 3 of the first embodiment illustrated in FIGS. 1 and 2.

In the electronic analysis using the test models 5 in FIGS. 6 and 7 described above, the electric field intensity of the analysis surface when 5 kV is applied in vacuum between an anode 51 and a cathode 52 spaced 2 mm apart by a spacer 53 is analyzed. In addition, an opening portion 54 simulates the opening portion 310 of the guard electrode 32. In addition, in the test model 5 in FIG. 7, an electric field shield body 50 is disposed as a conductor imitating the electric field shield body 1 similar to that of the first embodiment, and an electric field shielding structure similar to that of the first embodiment is adopted. Note that the analysis surface X was disposed at a position recessed 4 mm from the cathode surface (a position 4 mm lower from the cathode surface) as a simulation at the time of retraction of the emitter 30. The results of analyzing the electric field intensity under the same conditions in each test model 5 under the above-described conditions will be described below.

In the analysis result of the test model 5 of FIG. 7 having the same electric field shielding structure as that of the first embodiment, the electric field intensity in the vicinity of the central portion of an X-plane having the strongest electric field intensity is ⅓ or less as compared with that of the analysis result in the case of not having the electric field shielding structure. Accordingly, the electric field shielding effect by the electric field shielding structure of the first embodiment can be confirmed.

As described above, by using the electric field shielding structure of the first embodiment for the electric field emission device, the electric field applied to the emitter 30 at the time of the reforming treatment is weakened, and damage to the emitter 30 due to electron emission from the emitter 30 is suppressed. As a result, it is possible to shield the emitter surface electric field even when a desired retraction amount of the emitter 30 is not obtained (the retraction amount of the emitter 30 is small), and a predetermined withstand voltage can be obtained by applying a sufficiently high voltage between the target 41 and the guard electrode 32 to perform the reforming treatment.

Second Embodiment

Figure 9:
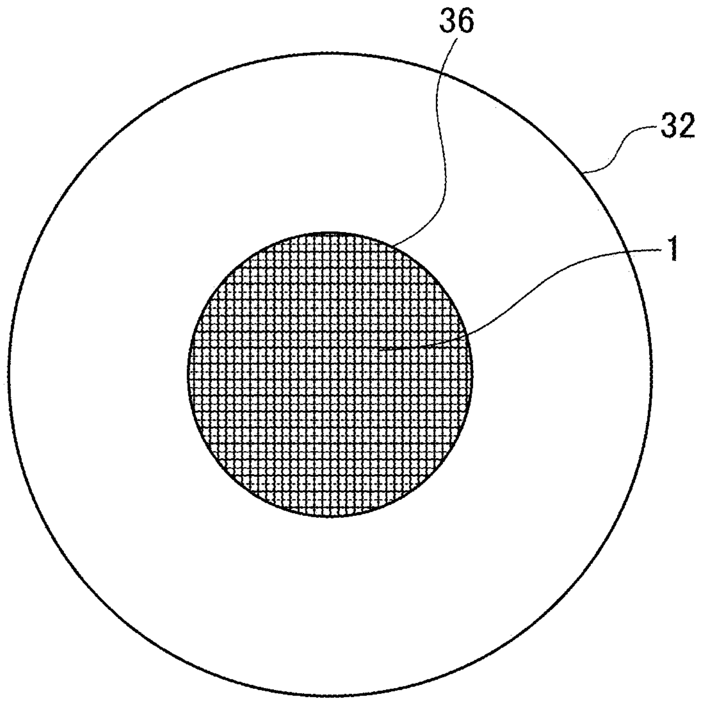
FIG. 9 is a schematic plan diagram of an electric field shielding structure of an electric field emission device according to a second embodiment.

FIG. 9 is a schematic plan diagram of an electric field shielding structure in an electric field emission device 10 of a second embodiment. The second embodiment has the same configuration as the electric field emission device 10 of the first embodiment except that the electric field shield body 1 is formed of element wires or wires disposed in a lattice shape (mesh shape), and thus the description of the same points will be appropriately omitted in the description.

The electric field shield body 1 of the second embodiment is formed by weaving (braiding) linear members such as element wires or wires that are a conductor at predetermined intervals so as to form a lattice shape. Any method for forming the electric field shield body 1 may be used as long as the electric field shield body 1 is woven into a lattice shape. In addition, the predetermined interval may be an arbitrary interval, and for example, the respective element wires or wires may be woven so as to have equal intervals or irregular intervals. In addition, when the element wires and the wires are used, they may be combined and woven into a lattice shape. As described above, by forming the electric field shield body 1 into a lattice shape, the strength (physical strength) of the electric field shield body 1 constituting the electric field shielding structure can be improved.

In addition, in the electric field shield body 1 of the second embodiment, the diameter, the number, and the positional intervals of the element wires or the wires used to form the lattice shape can be arbitrarily configured. As a result, the electric field shield body 1 can be formed according to the necessary output of the electric field emission device 10.

In addition, the electric field shield body 1 of the second embodiment may be configured to be detachable when fixed to the opening edge portion of the guard electrode 32. In this case, it is possible to prepare a plurality of electric field shield bodies 1 having different diameters, numbers, and positional intervals of element wires or wires used to form a lattice shape, and change the electric field shield body 1 according to the necessary output of the electric field emission device 10. As a result, it is also possible to control the output of the electric field emission device 10. Note that the material of the electric field shield body 1 and the method for fixing the guard electrode 32 to the opening edge portion in the second embodiment are the same as those of the first embodiment.

In addition, since the electric field shield body 1 of the second embodiment has a lattice shape, more edges 33*a* that are formed as the electron generation portion 33 is crushed by the retraction of the emitter 30 are formed than in the first embodiment. Thus, when the electron generation portion 33 generates electrons by voltage application and emits the electron beam L1, electron emission efficiency can be improved by electric field concentration at the edges 33*a* as compared with the first embodiment.

As described above, by configuring the electric field shield body 1 in a lattice shape, in addition to the effects of the first embodiment, the strength of the electric field shield body 1 is increased, and further, the electron emission efficiency can be improved as compared with the first embodiment by the electric field concentration of the plurality of edges 33*a*.

Third Embodiment

Figure 10:
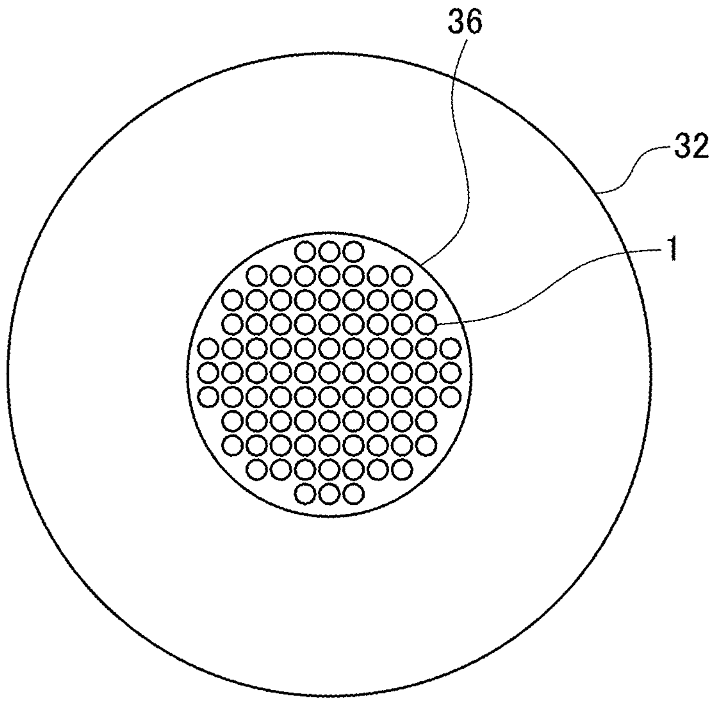
FIG. 10 is a schematic plan diagram of an electric field shielding structure of an electric field emission device according to a third embodiment.

FIG. 10 is a schematic plan diagram of an electric field shielding structure in an electric field emission device 10 of a third embodiment. The third embodiment has the same configuration as the electric field emission device 10 of the first embodiment except that an electric field shield body 1 is formed in a plate shape having a plurality of through-holes, and thus the description of the same points will be appropriately omitted in the description.

The electric field shield body 1 of the third embodiment uses a conductor plate formed in a flat plate shape. Then, the plurality of through-holes is formed in the conductor plate in the third embodiment. In addition, in addition to the conductor plate, a conductor foil may be used as the electric field shield body 1 in the third embodiment. By using the electric field shield body 1 having a flat plate shape as described above, the emitter surface electric field becomes more uniform than in the first embodiment when the electric field shield body 1 crushes the electron generation portion 33 by the retraction of the emitter 30. Since the emitter surface electric field becomes uniform, the emission of electrons generated from the electron generation portion 33 is more stable than in the first embodiment. That is, it is possible to reduce variations in the output of the electron generation portion 33.

In addition, since the electric field shield body 1 of the third embodiment includes the plurality of through-holes, more edges 33*a* to be formed are formed than in the first embodiment. Thus, when the electron generation portion 33 generates electrons by voltage application and emits the electron beam L1, electron emission efficiency can be improved by electric field concentration at the edges 33*a* as compared with the first embodiment.

Further, the plurality of through-holes in the electric field shield body 1 of the third embodiment can be formed at arbitrary intervals, and may be formed at equal intervals or irregular intervals, for example. In addition, the size of the diameter of the through-hole in the electric field shield body 1 can also be arbitrary. For example, all the diameters of the holes may be the same diameter, or the diameters of the holes may be different diameters. In addition, although the shape of the through-hole of the electric field shield body 1 has a circular shape in the third embodiment, it is not limited thereto, and the shape of the through-hole may have a substantially rectangular shape or a polygonal shape. In addition, regarding the number of through-holes, the number to be processed is determined according to the size of opening portion 310 of the guard electrode 32 and the diameter of the through-hole. That is, the number of through-holes of the electric field shield body 1 can also be arbitrary.

In this manner, the diameter, the interval, the shape, and the number of the through-holes of the electric field shield body 1 can be arbitrarily configured. As a result, the electric field shield body 1 can be formed according to the necessary output of the electric field emission device 10. In addition, the electric field shield body 1 of the third embodiment may be configured to be detachable when fixed to the opening edge portion of the guard electrode 32. In this case, it is possible to prepare a plurality of electric field shield bodies 1 in which all or some of the diameter, the interval, the shape, and the number of the through-holes of the electric field shield body 1 are different, and change the electric field shield body 1 according to the necessary output of the electric field emission device 10. As a result, it is also possible to control the output of the electric field emission device 10.

Note that the size of the outer periphery of the electric field shield body 1 of the third embodiment is formed to be an outer peripheral dimension smaller than an outer peripheral dimension (outer diameter) of the opening portion 310 of the guard electrode 32. As a result, the electric field shield body 1 can be inserted into the inside of the opening portion 310 of the guard electrode 32, and can be fixed to the opening edge portion of the guard electrode 32 so as to be closer to the surface 36*b* facing the one side than to the surface 36*a* facing the other side in the edge portion 36 of the guard electrode 32. Note that the material of the electric field shield body 1 and the method for fixing the guard electrode 32 to the opening edge portion in the third embodiment are the same as those of the first embodiment.

As described above, by forming the electric field shield body 1 in a plate shape and forming the plurality of through-holes, in addition to the effects of the first embodiment, the strength of the electric field shield body 1 is increased, further the emitter surface electric field becomes uniform, and variations in the output of the electron generation portion 33 can be reduced. Further, the electron emission efficiency can be improved as compared with the first embodiment by the electric field concentration of the plurality of edges 33*a*.

Although the preferred embodiments of the present invention have been described above, various improvements and design changes may be made in the present invention without departing from the gist of the present invention.

The present application claims priority based on Japanese Patent Application No. 2021-187431 filed on Nov. 17, 2021, the entire contents of which are incorporated herein by reference.

REFERENCE SIGNS LIST

1 electric field shield body
30 emitter
31 emitter support portion
32 guard electrode
33 electron generation portion
36 edge portion
36*a* surface facing other side of edge portion
36*b* surface facing one side of edge portion
310 opening portion

The invention claimed is:

1. An electric field emission device comprising:

a vacuum vessel configured to include a vacuum chamber;

an emitter that is positioned on a first side of the vacuum chamber in an axial direction of the vacuum chamber and includes an electron generation portion facing an opposing second side of the vacuum chamber in the axial direction of the vacuum chamber;

a target that is positioned on the second side of the vacuum chamber and provided to face the emitter;

a guard electrode that is a cylindrical body provided on an outer peripheral side of the emitter, is fixed to the vacuum vessel on a first side of the guard electrode, and has an opening portion on an opposing second side of the guard electrode;

a support configured to move the emitter in the axial direction on an inner side of the guard electrode; and an electric field shield body that is formed of a conductor connected to the guard electrode and is disposed on one side of an edge portion of the guard electrode, wherein:

the electric field shield body is disposed so as to partially overlap the opening portion on a projection plane in the axial direction, and is formed in a shape partitioning the opening portion into a plurality of areas; and the emitter is configured such that when the emitter moves toward the electric field shield body and comes into contact with the guard electrode and the electric field shield body, the electric field shield body extends into the electron generation portion to partition the electron generation portion such that edges are formed in the electron generation portion.

2. The electric field emission device according to claim 1, wherein the electric field shield body is formed of one or more linear members fixed to an edge portion of the opening portion.

3. The electric field emission device according to claim 2, wherein the electric field shield body is formed of the linear members disposed in a lattice shape.

4. The electric field emission device according to claim 1, wherein the electric field shield body is formed in a plate shape having a plurality of through-holes.

5. The electric field emission device according to claim 1, wherein at least one surface of the emitter or the support is electrically insulating at a contact portion between the emitter and the support.

6. The electric field emission device according to claim 1, wherein an axial height of the electric field shield body along the axial direction is formed to be lower than an axial height of the electron generation portion along the axial direction.

7. The electric field emission device according to claim 1, wherein the electric field shield body is formed integrally with the guard electrode.

* * * * *